(12) United States Patent
Branson

(10) Patent No.: US 8,578,010 B2
(45) Date of Patent: Nov. 5, 2013

(54) METHODS AND SYSTEM FOR TRACKING WEB PAGE ANALYTICS

(75) Inventor: Jeffrey Lynn Branson, Saint Charles, MO (US)

(73) Assignee: MasterCard International Incorporated, Purchase, NY (US)

(*) Notice: Subject to any disclaimer, the term of this patent is extended or adjusted under 35 U.S.C. 154(b) by 627 days.

(21) Appl. No.: 12/641,107

(22) Filed: Dec. 17, 2009

(65) Prior Publication Data

US 2011/0153796 A1 Jun. 23, 2011

(51) Int. Cl.
*G06F 15/16* (2006.01)

(52) U.S. Cl.
USPC .......... 709/223; 709/224; 709/230; 709/202; 709/203; 709/217

(58) Field of Classification Search
USPC ............ 709/223, 224, 230, 202, 203, 217
See application file for complete search history.

(56) References Cited

U.S. PATENT DOCUMENTS

| | | | |
|---|---|---|---|
| 6,691,176 B1* | 2/2004 | Narin et al. .................. 719/318 |
| 7,260,622 B2* | 8/2007 | Goodwin et al. ............ 709/223 |
| 7,464,187 B2 | 12/2008 | Glommen et al. |
| 7,502,994 B2 | 3/2009 | Kocol |
| 7,620,697 B1 | 11/2009 | Davies |
| 2002/0143814 A1* | 10/2002 | Hepworth et al. ........... 707/512 |
| 2005/0267976 A1* | 12/2005 | Chang et al. ................. 709/230 |
| 2007/0143343 A1 | 6/2007 | Iverson |
| 2008/0046562 A1 | 2/2008 | Butler |
| 2008/0140832 A1* | 6/2008 | Brauneis et al. ............. 709/224 |
| 2008/0249905 A1 | 10/2008 | Wong et al. |
| 2010/0229243 A1* | 9/2010 | Lin et al. ......................... 726/27 |
| 2011/0125593 A1* | 5/2011 | Wright et al. ............. 705/14.73 |

* cited by examiner

*Primary Examiner* — Lan-Dai T Truong
(74) *Attorney, Agent, or Firm* — Armstrong Teasdale LLP

(57) ABSTRACT

A system and methods for a web-based analytics tracking system are provided. The system includes a data structure having a plurality of web page identifiers that are each associated with a respective web page, the web pages each located on a respective one of plurality of first servers connected together using a network, the data structure further including tag information specific to each of the plurality of respective web pages, the data structure is located on a second server different than the first servers. The system also includes a tracking script including a programmed to load a loader program located on the second server, the loader program is configured to query the data structure for tag information relating to the selected web page, build an image tag request using the tag information, and insert the image tag request into the selected web page.

13 Claims, 7 Drawing Sheets

METHODS AND SYSTEM FOR TRACKING WEB PAGE ANALYTICS

BACKGROUND OF THE INVENTION

The field of the invention relates generally to tracking website analytics, and more specifically, to a system and methods for tracking a user's utilization of one or more web pages hosted on various domains.

Website statistic software is used to track a visitor's navigation to a web page and the visitor's navigation within the web page. Using a current analytics implementation, many web properties are "tagged", for example, if 150 or more websites may be used by an entity to accomplish their web presence, each website includes tags that when activated by navigation with a web page associated with the websites, metric information is sent to a third party analytics provider. Each web page is "tagged" using a set of JavaScript or other script files that are customized for each domain and/or content section of a domain. These files dynamically gather and pass required analytics variables from the client browser to an analytics vendor. The files themselves reside on the same domain as the remainder of the site for which they have been customized. These script files do not reside in any common location relative to each other, and pushing code updates to each site requires coordination with each site business owner and site technical owner. Moreover, risk is introduced into this process due to versioning issues, incorrect code implementation, and the files outliving their intended implementation period.

BRIEF DESCRIPTION OF THE INVENTION

In one embodiment, a web-based analytics tracking system includes a data structure having a plurality of web page identifiers that are each associated with a respective web page, the web pages each located on a respective one of a plurality of first servers connected together using a network, the data structure further including tag information specific to each of the plurality of respective web pages, the data structure located on a second server different than the first servers. The system also includes a tracking script including a first line of code programmed to load a loader program located on the second server, the loader program configured to load a dynamic wrapper, the dynamic wrapper programmed to retrieve an address of a selected one of the plurality of respective web pages, parse the retrieved address using a predetermined process, query the data structure for tag information relating to the selected web page, build an image tag request using the tag information, and insert the image tag request into the selected web page.

In another embodiment, a method of tracking website analytics includes loading at least one of a plurality of web pages hosted on a first server, each web page including a script programmed to load a dynamic wrapper. The method also includes querying a data source residing on a second server separate from the first server wherein the data source includes tag information for each tag tracked on each of the plurality of web pages, building a dynamically changeable tracking pixel using the queried tag information, loading the built tracking pixel into a respective one of the at least one of a plurality of web pages, and transmitting at least one of a status of the respective one of the at least one of a plurality of web pages and a user's navigation activity on the respective one of the at least one of a plurality of web pages.

In yet another embodiment, a method of tracking website analytics includes retrieving a Uniform Resource Locator (URL) of a web-based document, the document located in a first server, parsing the document URL using a predetermined process, and querying a data structure, located in a second server, for tag information to be used to build an image tag request. The method further includes compiling the tag information based on the queried data into a tracking pixel, inserting the tracking pixel into the document, and communicating information received by the tracking pixel to a database located in the second server.

BRIEF DESCRIPTION OF THE DRAWINGS

FIG. 1 is a schematic block diagram of a web-based analytics tracking system in accordance with an exemplary embodiment of the present invention;

FIG. 2 is a simplified block diagram of another exemplary embodiment of the web-based analytics tracking system shown in FIG. 1;

FIG. 3 is an expanded block diagram of an exemplary embodiment of a server architecture of the web-based analytics tracking system shown in FIG. 1;

FIG. 4 illustrates an exemplary configuration of a user computing device operated by a user such as the client device shown in FIG. 3;

FIG. 5 illustrates an exemplary configuration of a server computing device such as server system shown in FIG. 3;

FIG. 6 is a flow diagram of a method of tracking website analytics in accordance with an exemplary embodiment of the present invention; and FIG. 7 is a schematic block diagram of a dynamic tagging architecture in accordance with an exemplary embodiment of the present invention.

DETAILED DESCRIPTION OF THE INVENTION

The following detailed description illustrates embodiments of the invention by way of example and not by way of limitation. It is contemplated that the invention has general application to analytical and methodical embodiments of tracking software code for web page analytics in industrial, commercial, and residential applications.

As used herein, an element or step recited in the singular and proceeded with the word "a" or "an" should be understood as not excluding plural elements or steps, unless such exclusion is explicitly recited. Furthermore, references to "one embodiment" of the present invention are not intended to be interpreted as excluding the existence of additional embodiments that also incorporate the recited features.

Methods and a system for monitoring web page activity and analytics relating to web page activity are described herein. The methods and systems described herein include a tracking server having a Dynamic Analytics Wrapper (DAW). This DAW includes computer code stored at the tracking server that builds and configures a script that in turn builds an image tag from tag information stored on the tracking server to monitor web page activity and analytics using tag information stored remotely from the web pages and in a common location. Throughout this description, the embodiments and examples shown should be considered as exemplary, rather than limitations on the systems and methods disclosed or claimed. The systems and methods for monitoring web page activity described herein may be used to improve security of tracking web page analytics, improve performance, reduce risk, provide cost savings, and for other purposes.

Figure 1:
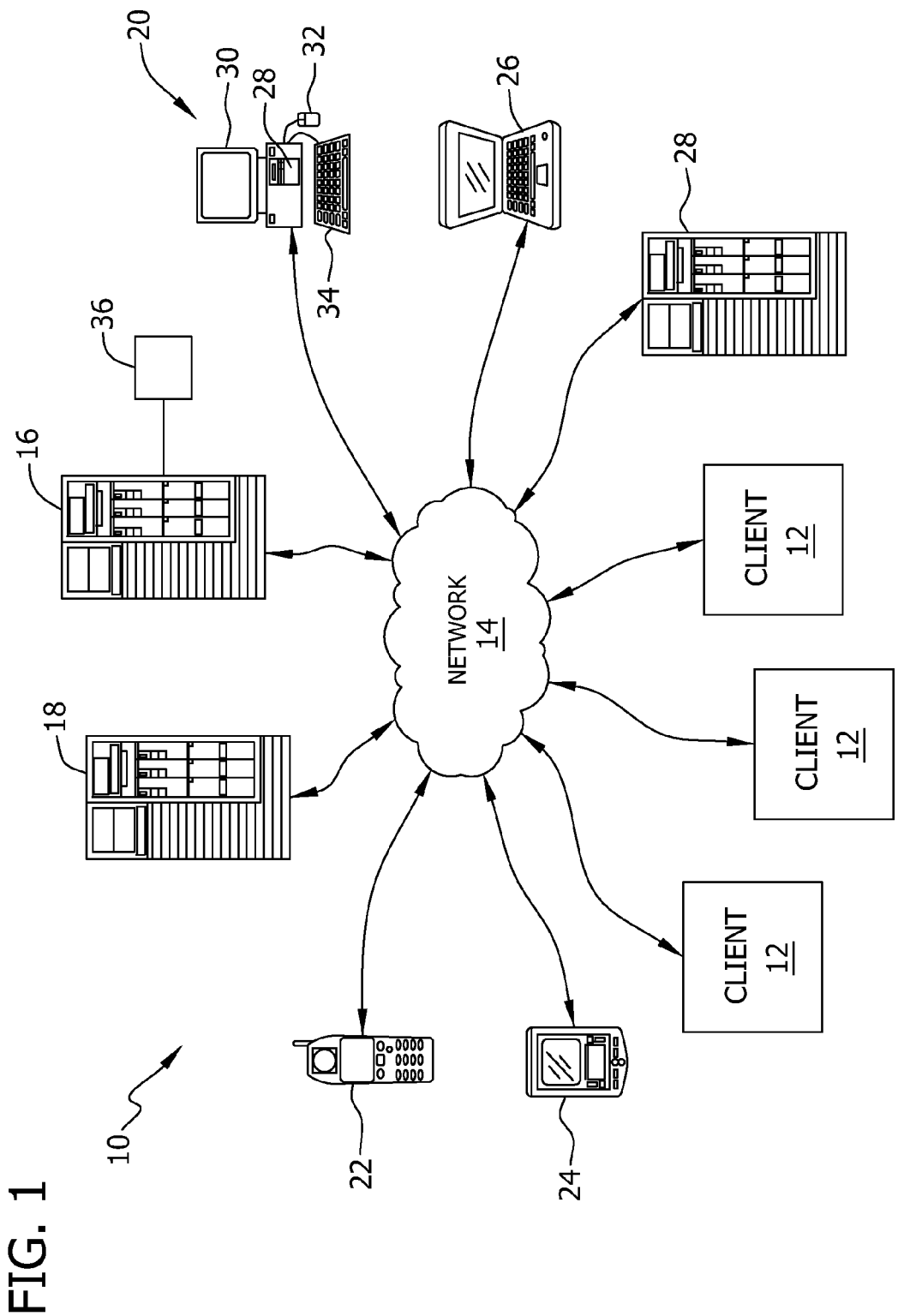
FIGS. 1-7 show exemplary embodiments of the methods and system described herein.

FIG. 1 is a schematic block diagram of a web-based analytics tracking system 10 in accordance with an exemplary embodiment of the present invention. In the exemplary embodiment, system 10 includes a plurality of client devices 12 that may be coupled with and communicate over a network 14 with other client devices 12 and with one or more tracking servers 16 and other servers 18. Similarly, multiple tracking servers 16 and other servers 18 may be coupled with and communicate over network 14 with other tracking servers 16 and other servers 18 as well as with one or more client devices 12.

A tracking server 16 may include software and/or hardware for providing the functionality and features described herein. A combination of one or more of each of servers 16, servers 18 and client devices 12 may include software for providing the functionality and features described herein. Tracking server 16, other servers 18, and the client devices 12, may be computing devices.

A computing device, as used herein, refers to a device with a processor, memory, network interface, and a storage device. Computing devices are capable of executing instructions. The term computing device includes, but is not limited to, a personal computer 20, server computers such as tracking server 16 and other server 18, computing tablets, set top boxes, video game systems, personal video recorders, telephones, cellular telephones 22, digital telephones, personal digital assistants (PDAs) 24, portable computers, notebook computers 26, and laptop computers. Computing devices may run an operating system, including, for example, variations of the Linux, Unix, MS-DOS, Microsoft Windows, Palm OS, Symbian OS, and Apple Mac OS X operating systems. Computing devices also include communications software that allows for communication over network 14. Depending on the computing device, the communications software may provide support for communications using one or more of the following communications protocols or standards: the User Datagram Protocol (UDP), the Transmission Control Protocol (TCP), the Internet Protocol (IP), and the Hypertext Transport Protocol (HTTP); one or more lower level communications standards or protocols such as, for example, the 10 and/or 40 Gigabit Ethernet standards, the Fibre Channel standards, one or more varieties of the IEEE 802 Ethernet standards, Asynchronous Transfer Mode (ATM), X.25, Integrated Services Digital Network (ISDN), token ring, frame relay, Point to Point Protocol (PPP), Fiber Distributed Data Interface (FDDI); and other protocols. Computing devices may include a network interface card, network chip, or network chip set that allows for communication over network 14.

The techniques described herein may be implemented in software stored on storage media accessible either directly or via a storage device 28 such as a hard disk drive or other drive included with or otherwise coupled or attached to a computing device. As such, storage media are readable by a computing device or other machine and may be referred to as machine readable media. These storage media include, for example, magnetic media such as hard disks, floppy disks and tape; optical media such as compact disks (CD-ROM and CD-RW) and digital versatile disks (DVD and DVD±RW); flash memory cards; and other storage media. As used herein, a storage device is a device that allows for reading and/or writing to a storage medium. Storage devices include, hard disk drives, DVD drives, flash memory devices (such as readers and writers), and others.

The processes, methods, functionality and features of analytics tracking system 10 described herein may be embodied in whole or in part in software which operates on tracking server 16, another server 18 and/or on a client device 12. The software may be in the form of, for example, one or more of an applet (e.g., a Java applet), a browser plug-in, an application program plug-in, a component object model (COM) object, a dynamic linked library (DLL), a script (e.g., JavaScript, VBScript), ActionScript, an ActiveX control, a subroutine, an operating system component or service, firmware, an application program, and/or a combination thereof. The software may be implemented in one or more programming languages such as, for example, high level programming languages including C, C++, Java, Visual Basic, the hypertext markup language (HTML), Perl, Python, and others; or low level assembly and machine language.

Client devices 12 may include a display 30, user input devices, such as a mouse 32 and a keyboard 34, storage media and/or a storage device 28. For example, when client device 12 is a personal computer 20, personal computer 20 includes display 30, keyboard 34, mouse 32 and storage device 28. Client devices 12 may have one or more user input devices, including, for example, keyboard 34, mouse 32, a track ball, a scroll wheel, a touch pad, a key pad, a touch screen, navigation buttons, a joystick, a pen and tablet, a stylus, and others. A user may use a user input device to click on, select, or otherwise activate or control a user interface item such as a button, link, slider, etc. and to provide input to the operating system or programs running on the client device via a graphical user interface, text interface or other user interface provided on the Client device 12.

In the exemplary embodiment, tracking server 16 and other servers 18 are computing devices that are typically more robust than client device 12, having greater processing capabilities, greater network throughput, and/or greater storage space when compared to personal computer 20, cellular telephone 22, or other client device. Although shown as a single server, each of tracking server 16 and other servers 18 may each be a server farm, group of servers (including application servers, database servers, content servers, and others), and may include a firewall, load balancer, and other network devices and may include multiple devices in multiple locations.

In various embodiments tracking server 16 may include typical server software such as, for example, an operating system and communications software as well as database software for managing a database such as metabase 36. Tracking server 16 may contain or have access to metabase 36. Tracking server 16 may have one or more databases and other facilities to maintain information about analytics tracking system 10 as described herein. Tracking server metabase 36 may contain information about addresses, identifiers, and tag information for websites. The stored information may include one or more of a unique identifier related to a particular web page or domain and tag information relating to each associated web page. Metabase 36 may be object oriented, relational, structured query language (SQL), and/or other. Tracking server 16 may access metabase 36 or provide access to metabase 36.

Network 14 may be a single network or a combination of multiple networks, including one or more of a local area network (LAN), a wide area network (WAN), a wireless wide-area networks (WWAN), a global system for mobile communications (GSM) network, an enhanced data for GSM evolution (EDGE), and a public switched telephone network (PSTN). In one embodiment, network 14 is the Internet. Network 14 may support various versions of the Ethernet protocol, the Internet protocol, and other data communications and/or voice communications protocols. Network 14 may be or include one or more of each of a packet switched network and/or a circuit switched network.

Tracking server 16, other servers 18 and client devices 12 may communicate over network 14 via wired and/or wireless communications. Tracking server 16, other servers 18 and Client devices 12 may communicate data units over the network 14. As used herein, a data unit refers to a frame, cell, datagram, packet or other unit of information.

Client devices 12 may include an Internet browser such as Mozilla Firefox, Opera Software's Opera Web Browser, and Microsoft Internet Explorer. Internet browsers are capable of communicating and receiving data units. An Internet browser may be augmented with a Java virtual machine, which comprises a set of computer software programs and data structures that use a virtual machine model for the execution of other computer programs and scripts. An Internet browser may be augmented with a variety of plug-ins that provide additional functionality to the Internet browser. Internet browsers are capable of processing various communications protocols.

In the exemplary embodiment, tracking server 16 includes a Dynamic Analytics Wrapper (DAW) comprising two, constant lines of code (TLOC). In the exemplary embodiment, the TLOC is configured to determine whether client device 12 is enabled to run at least one of a predetermined script language and a predetermined multimedia language that facilitates loading of tag information from a central database, called a metabase, of tag information. If the Internet browser running on client device 12 is enabled to run a script language such as, but not limited to, JavaScript, the first line of the TLOC calls a loader.js script file that resides a common location. If the Internet browser running on client device 12 is not enabled to run JavaScript or another predetermined script language, a <noscript> portion of the web page is used to transmit a separate abbreviated image request to tracking server 16. In one embodiment, the image request is specific to a third party entity such as an analytics vendor and records a Uniform Resource Identifier (URI) of the web page from which the image is loaded. Using TLOC fully ensures that all traffic to various websites from all potential sources is documented or recorded.

The loader.js script detects if a multimedia platform or language of the client browser is enabled, for example, the loader.js may detect if the client browser is Flash-enabled. If the client browser is not multimedia-enabled or flash-enabled, loader.js duplicates the image tracking described above. If the client browser is multimedia-enabled or flash-enabled, the loader.js proceeds to load Dynamic Analytics Wrapper, such as, DynamicWrapper.swf.

The dynamic wrapper is configured to retrieve and parse the document URL in a predetermined manner. Next, the wrapper queries metabase 36, which in one embodiment is a flexible XML structure, to gather the appropriate data needed in order to build the complete image tag request. Once the dynamic wrapper has compiled the tag information it inserts it into the page as a tracking pixel. As described above, if the client browser is not script or multi-media enabled, a separate abbreviated image tag request is generated to track a subset of activity on the web page.

There are several technical advantages of using this strategy to build the tracking pixel. For example the systems and methods described herein facilitate improving security. Flash can allow access to our XML structure from across domains based on what domains we designate. JavaScript is not capable of accessing the XML across domains by itself. The Flash camouflages the source code being used to build the tag. Because the loader.js is standard across all sites the code can be obfuscated. This method preserves the integrity of the data being collected. Hosting the XML data and the dynamic wrapper to build the tags on a separate site virtually eliminates the possibility that an outside entity could use the same tracking code on their site.

Additionally, performance is improved. The Flash loads a compressed amount of code compared to what would be required with JavaScript. The dynamic wrapper only includes what is required for the image tag to be built. Previously, the sets of JavaScript files required for tagging would need to be comprehensive enough to handle various contingencies for an entire site or set of sites resulting in larger than necessary files in most cases. Custom tracking functions that would normally have been built into the sets JavaScript files can be included on the fly on a per-page basis if necessary.

Moreover, risk is reduced. The risk of errant implementations is greatly reduced using the two lines of code (TLOC) deployment method described herein. Testing time is greatly reduced with TLOC so that the tracking for each site can be quickly verified and debugged if necessary. The flexible nature of metabase 36 using the XML data architecture translates to the most current version of tracking code being available on our sites at all times. Site monitoring is increased to allow auditing of metrics collection in a highly efficient manner.

Additionally, the code inserted to create the "tag" into the pages includes a script portion, which may be the first line of code and a noscript portion that may be the second line of code. The JavaScript portion of the tag remains the same in all environments—internal or external. This accounts for approximately 98% of visitor tracking. The noscript portion of the tag varies essentially on a per-domain basis for those browsers that do not have JavaScript enabled. The elements that can vary include a cookie domain, a third party report suite (if used), and a random number generator that varies based on the server technology being used.

Figure 2:
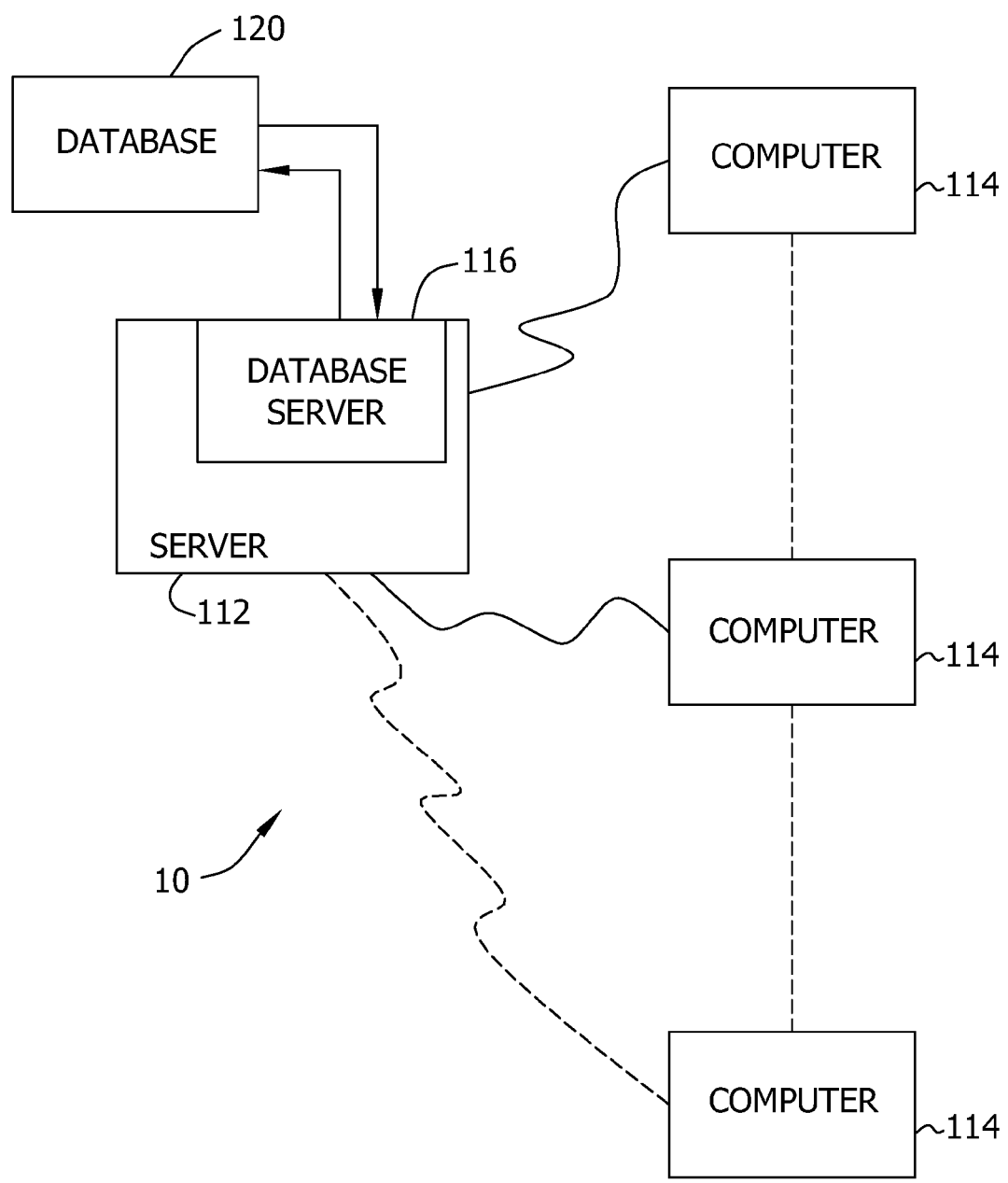

FIG. 2 is a simplified block diagram of another exemplary embodiment of web-based analytics tracking system 10 for gathering usage data of the web page, in accordance with one embodiment of the present invention. More specifically, in the example embodiment, system 10 includes a server system 112, and a plurality of client sub-systems, also referred to as client systems 114, connected to server system 112. In one embodiment, client systems 114 are computers including a web browser, such that server system 112 is accessible to client systems 114 using the Internet. Client systems 114 are interconnected to the Internet through many interfaces including a network, such as a local area network (LAN) or a wide area network (WAN), dial-in-connections, cable modems and special high-speed ISDN lines. Client systems 114 could be any device capable of interconnecting to the Internet including a web-based phone, personal digital assistant (PDA), or other web-based connectable equipment. A database server 116 is connected to a database 120 containing information on a variety of matters, as described below in greater detail. In one embodiment, centralized database 120 is stored on server system 112 and can be accessed by potential users at one of client systems 114 by logging onto server system 112 through one of client systems 114. In an alternative embodiment, database 120 is stored remotely from server system 112 and may be non-centralized. As discussed herein, database 120 stores information relating to web pages.

Figure 3:
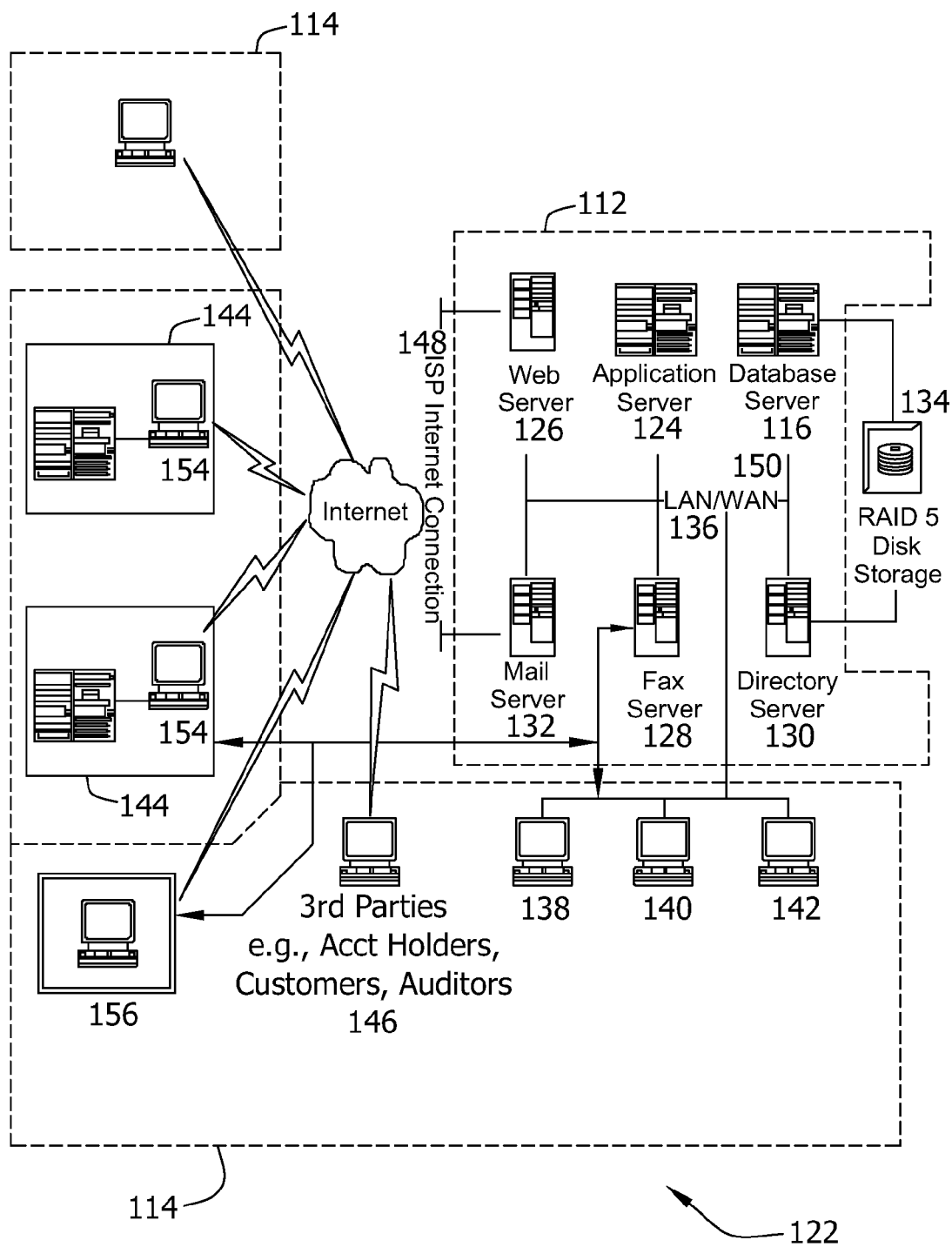

FIG. 3 is an expanded block diagram of an exemplary embodiment of a server architecture of web-based analytics tracking system 122, in accordance with one embodiment of the present invention. Components in system 122, identical to components of system 10 (shown in FIG. 1), are identified in FIG. 3 using the same reference numerals as used in FIG. 1. System 122 includes server system 112, and client systems 114. System 112 further includes database server 116, an application server 124, a web server 126, a fax server 128, a directory server 130, and a mail server 132. A storage device 134 is coupled to database server 116 and directory server 130. Storage device 134 is any computer-operated hardware for storing and/or retrieving data. Servers 116, 124, 126, 128, 130, and 132 are coupled in a local area network (LAN) 136. In addition, a system administrator's workstation 138, a user workstation 140, and a supervisor's workstation 142 are coupled to LAN 136. Alternatively, workstations 138, 140, and 142 are coupled to LAN 136 using an Internet link or are connected through an Intranet.

Each workstation, 138, 140, and 142 is a personal computer having a web browser. Although the functions performed at the workstations typically are illustrated as being performed at respective workstations 138, 140, and 142, such functions can be performed at one of many personal computers coupled to LAN 136. Workstations 138, 140, and 142 are illustrated as being associated with separate functions only to facilitate an understanding of the different types of functions that can be performed by individuals having access to LAN 136.

Server system 112 is configured to be communicatively coupled to various individuals, including employees 144 and to third parties, e.g., account holders, customers, auditors, etc., 146 using an ISP Internet connection 148. The communication in the exemplary embodiment is illustrated as being performed using the Internet, however, any other wide area network (WAN) type communication can be utilized in other embodiments, i.e., the systems and processes are not limited to being practiced using the Internet. In addition, and rather than WAN 150, local area network 136 could be used in place of WAN 150.

In the exemplary embodiment, any authorized individual having a workstation 154 can access system 122. At least one of the client systems includes a manager workstation 156 located at a remote location. Workstations 154 and 156 are personal computers having a web browser. Also, workstations 154 and 156 are configured to communicate with server system 112. Furthermore, fax server 128 communicates with remotely located client systems, including workstation 156 using, in one embodiment, a telephone link. Fax server 128 is configured to communicate with other client systems 114 and workstations 138, 140, and 142 as well.

Figure 4:
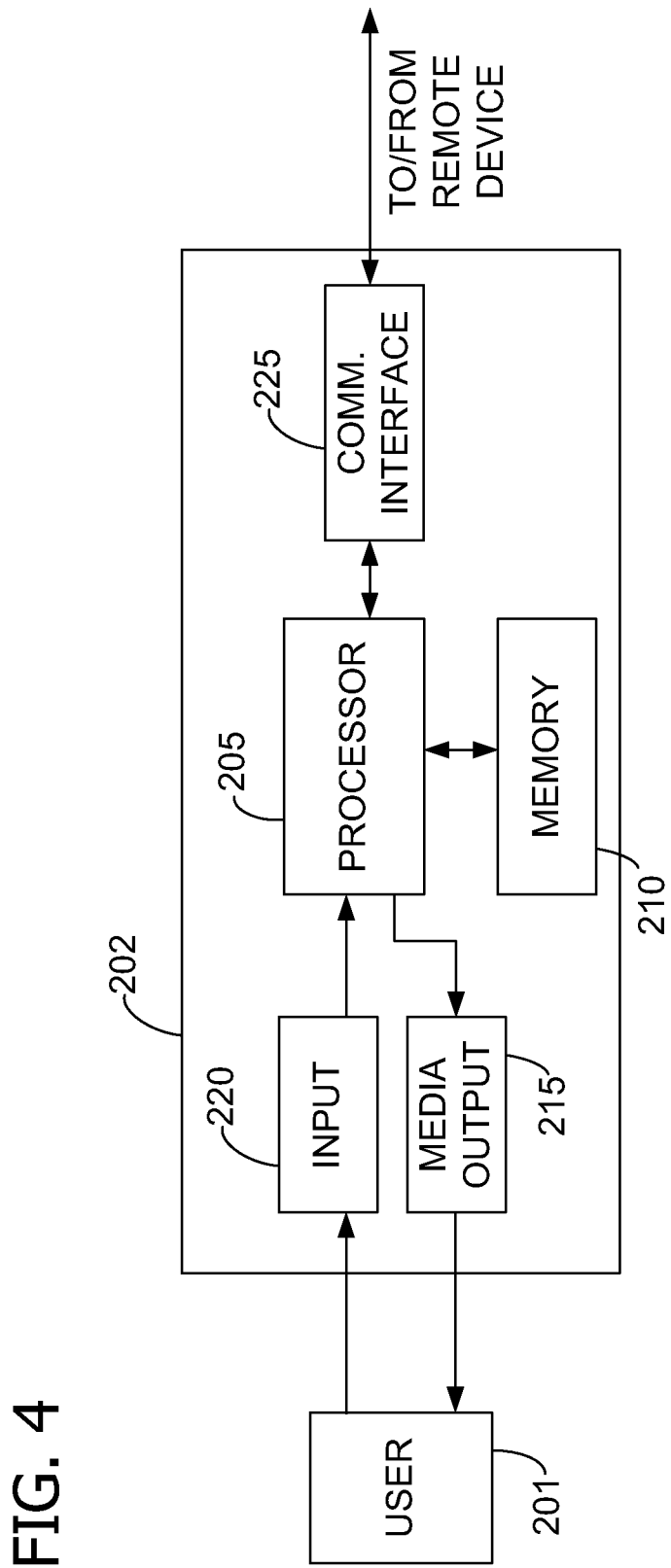

FIG. 4 illustrates an exemplary configuration of a user computing device 202 operated by a user 201. User computing device 202 may include, but is not limited to, client systems 114, workstations 138, 140, 142, and 154, and manager workstation 156.

User computing device 202 includes a processor 205 for executing instructions. In some embodiments, executable instructions are stored in a memory area 210. Processor 205 may include one or more processing units (e.g., in a multi-core configuration). Memory area 210 is any device allowing information such as executable instructions and/or written works to be stored and retrieved. Memory area 210 may include one or more computer-readable media.

User computing device 202 also includes at least one media output component 215 for presenting information to user 201. Media output component 215 is any component capable of conveying information to user 201. In some embodiments, media output component 215 includes an output adapter such as a video adapter and/or an audio adapter. An output adapter is operatively coupled to processor 205 and operatively couplable to an output device such as a display device (e.g., a liquid crystal display (LCD), organic light emitting diode (OLED) display, or "electronic ink" display) or an audio output device (e.g., a speaker or headphones).

In some embodiments, user computing device 202 includes an input device 220 for receiving input from user 201. Input device 220 may include, for example, a keyboard, a pointing device, a mouse, a stylus, a touch sensitive panel (e.g., a touch pad or a touch screen), a gyroscope, an accelerometer, a position detector, or an audio input device. A single component such as a touch screen may function as both an output device of media output component 215 and input device 220.

User computing device 202 may also include a communication interface 225, which is communicatively couplable to a remote device such as server system 112. Communication interface 225 may include, for example, a wired or wireless network adapter or a wireless data transceiver for use with a mobile phone network (e.g., Global System for Mobile communications (GSM), 3G) or other mobile data network (e.g., Worldwide Interoperability for Microwave Access (WIMAX)).

Stored in memory area 210 are, for example, computer-readable instructions for providing a user interface to user 201 via media output component 215 and, optionally, receiving and processing input from input device 220. A user interface may include, among other possibilities, a web browser and client application. Web browsers enable users, such as user 201, to display and interact with media and other information typically embedded on a web page or a website from server system 112. A client application allows user 201 to interact with a server application from server system 112.

Figure 5:
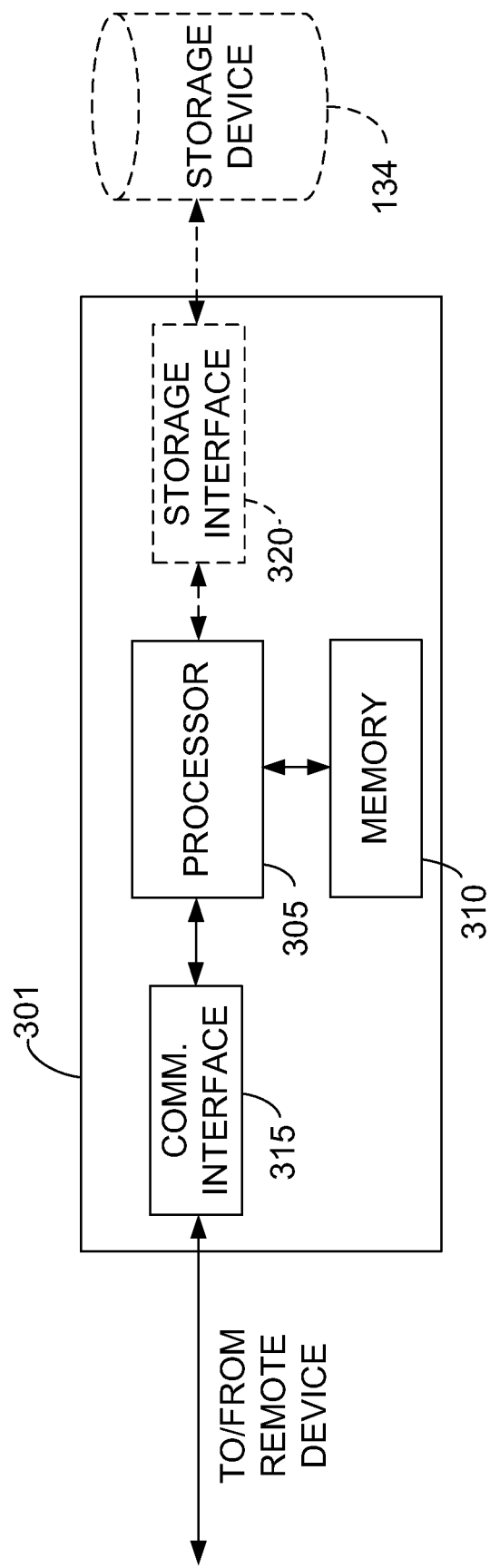

FIG. 5 illustrates an exemplary configuration of a server computing device 301 such as server system 112 (shown in FIG. 3). Server computing device 301 may include, but is not limited to, database server 116, application server 124, web server 126, fax server 128, directory server 130, and mail server 132.

Server computing device 301 also includes a processor 305 for executing instructions. Instructions may be stored in a memory area 310, for example. Processor 305 may include one or more processing units (e.g., in a multi-core configuration).

Processor 305 is operatively coupled to a communication interface 315 such that server computing device 301 is capable of communicating with a remote device such as user computing device 202 or another server computing device 301. For example, communication interface 315 may receive requests from user computing device such as client systems 114 via the Internet, as illustrated in FIG. 3.

Processor 305 may also be operatively coupled to a storage device 134. Storage device 134 is any computer-operated hardware suitable for storing and/or retrieving data. In some embodiments, storage device 134 is integrated in server computing device 301. For example, server computing device 301 may include one or more hard disk drives as storage device 134. In other embodiments, storage device 134 is external to server computing device 301 and may be accessed by a plurality of server computing devices 301. For example, storage device 134 may include multiple storage units such as hard disks or solid state disks in a redundant array of inexpensive disks (RAID) configuration. Storage device 134 may include a storage area network (SAN) and/or a network attached storage (NAS) system.

In some embodiments, processor 305 is operatively coupled to storage device 134 via a storage interface 320. Storage interface 320 is any component capable of providing processor 305 with access to storage device 134. Storage interface 320 may include, for example, an Advanced Technology Attachment (ATA) adapter, a Serial ATA (SATA)

adapter, a Small Computer System Interface (SCSI) adapter, a RAID controller, a SAN adapter, a network adapter, and/or any component providing processor 305 with access to storage device 134.

Figure 6:
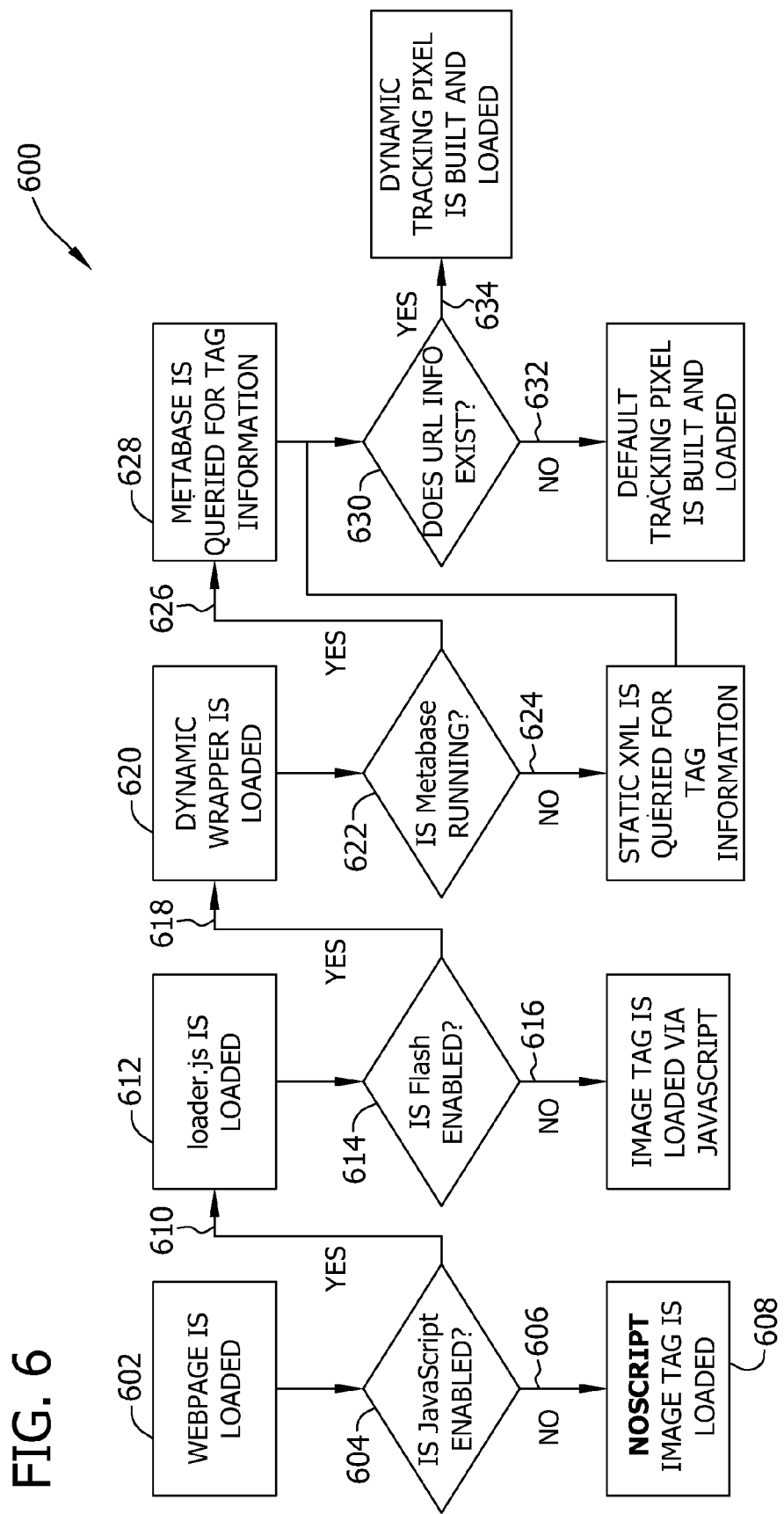

FIG. 6 is a flow diagram of a method 600 of tracking website analytics in accordance with an exemplary embodiment of the present invention. In the exemplary embodiment, one of a plurality of web pages, which may be located on one of a plurality of domains or servers is loaded 602 into a client browser. A first line of code embedded in the web page, for example, but not limited to at the end of the web page, determines 604 if a script language, such as, but not limited to, JavaScript, is enabled in the client browser that loaded the web page. If no 606, a second line of code loads 608 a noscript image tag that contains an abbreviated tag request. If yes 610, a script, such as, but not limited to, loader.js is loaded 612 from a common domain or server that is separate from the domains or servers hosting the plurality of web pages. The loader.js script determines 614 if a multimedia language, such as, Flash, is enabled in the client browser. If no 616, the image tag is loaded via the script language. The image tag is an abbreviated tag request. If yes 618, the dynamic wrapper is loaded 620, and determines 622 if the metabase is running. The metabase comprises the dynamic data structure that includes tag information for each of the web pages whose activity is being tracked. The metabase resides on a domain or server separate from the domains or servers hosting the web pages. If the metabase is not running 624, a static data structure is queried for an abbreviated set of tag information. If the metabase is running 626, the metabase is queried 628 for tag information and determines 630 if an identifier for the web pages exists in the metabase. If no 632, a default tracking pixel in built and loaded into the web page. If yes 634, the dynamic tracking pixel is built and loaded into the web page.

Figure 7:
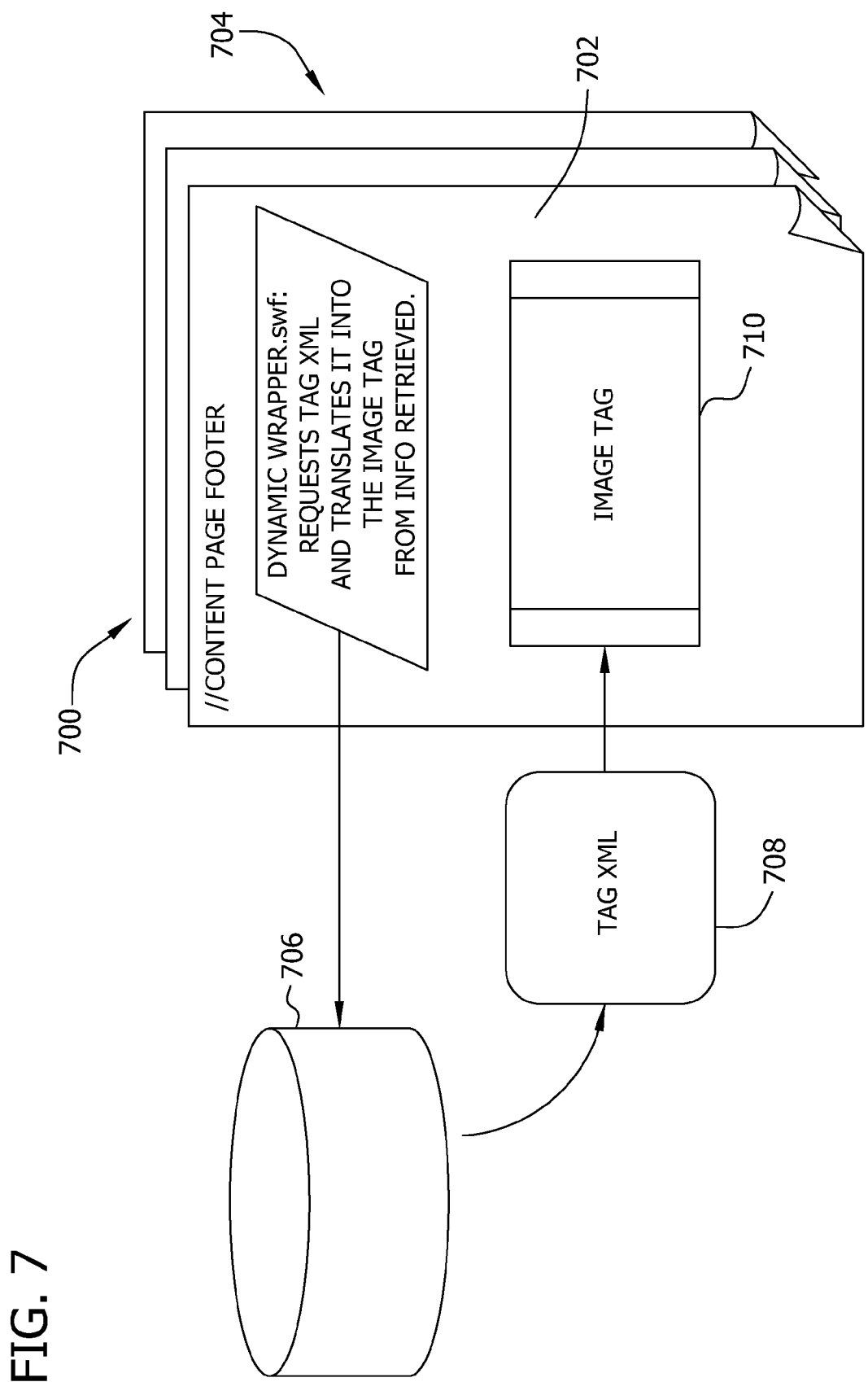

FIG. 7 is a schematic block diagram of a dynamic tagging architecture 700 in accordance with an exemplary embodiment of the present invention. In the exemplary embodiment, a web page 702 is representative of a plurality of web pages 704 that may be hosted on different domains or servers. Some of the plurality of web pages 704 may be hosted on the same domain or server as others of the plurality of web pages 704. Each web page 702 to be tracked includes two lines of code (TLOC) that determine if a dynamic tag can be implemented by checking the client browser settings to see if certain support features are enabled. For example, in one embodiment, JavaScript and Flash are used. If the support features are not present or enabled, a generic tag is loaded onto web page 702 and an abbreviated set of analytic data is downloaded. A database 706, or Metabase as database 706 is termed in some embodiments of the present invention, is located on a domain or server separate from the domains and/or servers hosting plurality of web pages 704. Tag information is stored, managed, and edited in database 706. Tag XML data 708 is maintained in database 706 and is used to generate an image tag 710 which is built and inserted in web page 702. Because tag XML data 708 is maintained in one location for all of the plurality of web pages 704 being tracked, maintenance for all the web pages occurs in one location on one domain or server without having to access multiple web pages over multiple domains when a change to the web pages becomes necessary.

The term processor, as used herein, refers to central processing units, microprocessors, microcontrollers, reduced instruction set circuits (RISC), application specific integrated circuits (ASIC), logic circuits, and any other circuit or processor capable of executing the functions described herein.

As used herein, the terms "software" and "firmware" are interchangeable, and include any computer program stored in memory for execution by the processor, including RAM memory, ROM memory, EPROM memory, EEPROM memory, and non-volatile RAM (NVRAM) memory. The above memory types are exemplary only, and are thus not limiting as to the types of memory usable for storage of a computer program.

As will be appreciated based on the foregoing specification, the above-described embodiments of the disclosure may be implemented using computer programming or engineering techniques including computer software, firmware, hardware or any combination or subset thereof, wherein the technical effect is providing a self-building tracking mechanism for a web-provider's web content. Any such resulting program, having computer-readable code means, may be embodied or provided within one or more computer-readable media, thereby making a computer program product, i.e., an article of manufacture, according to the discussed embodiments of the disclosure. The computer-readable media may be, for example, but is not limited to, a fixed (hard) drive, diskette, optical disk, magnetic tape, semiconductor memory such as read-only memory (ROM), and/or any transmitting/receiving medium such as the Internet or other communication network or link. The article of manufacture containing the computer code may be made and/or used by executing the code directly from one medium, by copying the code from one medium to another medium, or by transmitting the code over a network.

The Dynamic Analytics Wrapper described herein is a highly efficient third-generation analytics solution that provides a self-building tracking mechanism for web content. The Dynamic Analytics Wrapper replaces script files used with current analytics solutions with a single, constant line of code wherein the script files are customized for each domain and/or content section of a domain. After the Dynamic Analytics Wrapper is inserted into the content, it will never have to be altered within the content again. The solution provides a tracking medium in industrial, commercial, and residential applications of the analytics industry.

The above-described embodiments of methods and a system of tracking website analytics provides a cost-effective and reliable means for providing a self-building tracking mechanism for web content. More specifically, the methods and system described herein facilitate maintaining tracking mechanisms in a single location for a plurality of web pages in a plurality of domains. As a result, the methods and system described herein facilitate automatically building dynamic tag requests and providing web page analytics based on those requests in a cost-effective and reliable manner.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A web-based analytics tracking system, said tracking system comprising:
  a data structure comprising a plurality of web page identifiers that are each associated with a respective web page, the web pages each located on a respective one of a plurality of first servers connected together using a network, said data structure further comprising information specific to each of the plurality of respective web pages, said data structure located on a second server different than said first servers;

a tracking script comprising a first line of code programmed to load a loader program located on the second server, said loader program configured to load a dynamic wrapper, wherein said tracking script comprises a second line of code programmed to transmit an abbreviated tag request if a script language or a multimedia language of a client browser accessing a selected web page is not enabled, the dynamic wrapper programmed to instruct a microprocessor to:

retrieve an address of a selected one of the plurality of respective web pages;

parse the retrieved address using a predetermined process;

query said data structure for information relating to the selected web page;

build an image tag request using the information; and insert the image tag request into the selected web page.

2. A web-based analytics tracking system in accordance with claim 1, wherein said address comprises a Uniform Resource Locator (URL).

3. A web-based analytics tracking system in accordance with claim 1, wherein said dynamic wrapper is further programmed to compile the information.

4. A web-based analytics tracking system in accordance with claim 1, wherein said dynamic wrapper is further programmed to insert the image tag request into the selected web page as a tracking pixel.

5. A web-based analytics tracking system in accordance with claim 1, wherein said image tag request is configured to transmit activity on the selected web page based on the information for the selected web page.

6. A method of tracking website analytics, the method comprising:

accessing a data structure comprising a plurality of web page identifiers that are each associated with a respective web page, the web pages each located on a respective one of a plurality of first servers connected together using a network, the data structure further comprising information specific to each of the plurality of respective web pages, the data structure located on a second server different than the first servers;

retrieving an address of a selected one of the plurality of respective web pages;

querying the accessed data structure for information relating to the selected web page;

determining, by a processor, that a script language of a client browser accessing the selected web page is not enabled;

building, based on the determination that a script language of the client browser accessing the selected web page is not enabled, a noscript image tag comprising an abbreviated image tag request using the information; and inserting the noscript image tag into the selected web page.

7. A method in accordance with claim 6, wherein the address comprises a Uniform Resource Locator (URL).

8. A method in accordance with claim 6, further comprising compiling the information.

9. A method in accordance with claim 6, wherein the noscript image tag request is configured to transmit activity on the selected web page based on the information for the selected web page.

10. A method of tracking website analytics, the method comprising:

accessing a data structure comprising a plurality of web page identifiers that are each associated with a respective web page, the web pages each located on a respective one of a plurality of first servers connected together using a network, the data structure further comprising information specific to each of the plurality of respective web pages, the data structure located on a second server different than the first servers;

retrieving an address of a selected one of the plurality of respective web pages;

querying the accessed data structure for information relating to the selected web page;

determining, by a processor, that a multimedia language of a client browser accessing the selected web page is not enabled;

building, based on the determination that the multimedia language of the client browser accessing the selected web page is not enabled, an abbreviated image tag request using the information; and inserting the abbreviated image tag request into the selected web page.

11. A method in accordance with claim 10, wherein the address comprises a Uniform Resource Locator (URL).

12. A method in accordance with claim 10, further comprising compiling the information.

13. A method in accordance with claim 10, wherein the abbreviated image tag request is configured to transmit activity on the selected web page based on the information for the selected web page.

* * * * *